March 5, 1968  R. S. DICKINSON  3,371,751
TELESCOPIC HYDRAULIC SHOCK ABSORBERS
Filed Oct. 19, 1965  2 Sheets-Sheet 1
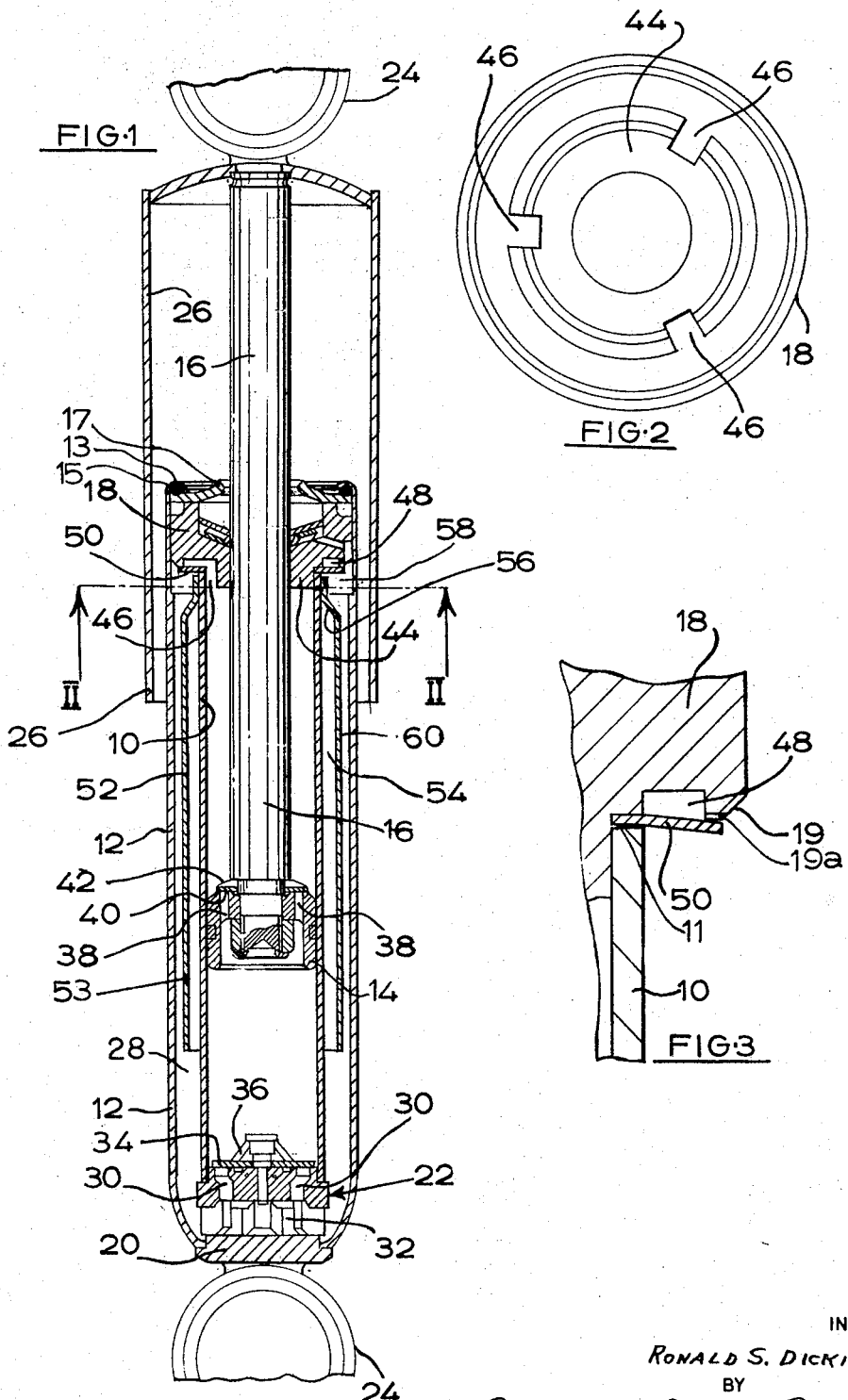
INVENTOR:
RONALD S. DICKINSON
BY
Browne, Schuyler & Beveridge
ATTORNEYS March 5, 1968 R. S. DICKINSON 3,371,751
TELESCOPIC HYDRAULIC SHOCK ABSORBERS
Filed Oct. 19, 1965 2 Sheets-Sheet 2

INVENTOR:
RONALD S. DICKINSON
BY
Browne, Schuyler & Beveridge
ATTORNEYS

United States Patent Office 3,371,751
Patented Mar. 5, 1968

3,371,751
TELESCOPIC HYDRAULIC SHOCK
ABSORBERS
Ronald Sidney Dickinson, Osbaldwick, York, England, assignor to Armstrong Patents Co. Limited, London, England, a British company.
Filed Oct. 19, 1965, Ser. No. 497,923
Claims priority, application Great Britain, Oct. 20, 1964, 42,641/64
3 Claims. (Cl. 188—88)

ABSTRACT OF THE DISCLOSURE

This invention concerns a tubular hydraulic shock absorber for use in automobiles and employs a valved piston displaceable in an inner hydraulic pressure cylinder closed at each end by means including one-way valve means so arranged that hydraulic fluid is always moved in the same direction through the pressure cylinder irrespective of the direction of piston displacement. The pressure cylinder is surrounded by a coaxially arranged outer cylinder which co-operates with the pressure cylinder to define an annular space acting as a reservoir for hydraulic fluid and from the end of the pressure cylinder at which hydraulic fluid is discharged into the reservoir there extends into the reservoir space, a cylindrical shroud arranged in close-spaced relation to the outer cylinder to inhibit foaming in the fluid by confining it to a long and narrow flow path. The manufacture of the shock absorber is simplified by making all the valve means in the form of diaphragm valves and the damping characteristics of the shock absorber are determined by pretensioning the diaphragm of at least one of the valve means.

---

Figure 4:
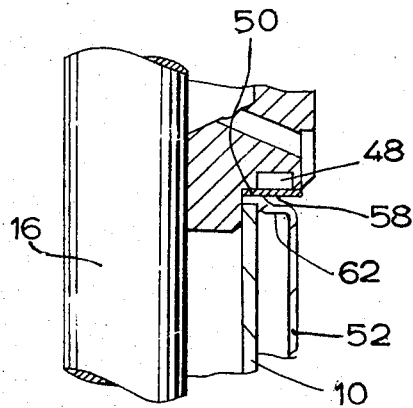

This invention concerns telescopic hydraulic shock absorbers of the type comprising a piston working in a hydraulic pressure cylinder which is coaxially enclosed within an outer cylinder in such a manner that the annular space defined between the two cylinders constitutes a reservoir for hydraulic fluid, a valve system being provided to cause the flow of hydraulic fluid which occurs between the pressure cylinder and the reservoir when the shock absorber is operating always to take place in the same direction. Such shock absorbers, hereinafter referred to as being shock absorbers of the type defined, are sometimes known as one-way shock absorbers.

The space required internally of such a shock absorber for the valve system which achieves the unidirectional hydraulic fluid circulation results in external shock absorber dimensions, notably of the reservoir cylinder diameter, which it is desirable to reduce having regard to other suspension design considerations.

According to the present invention, in shock absorbers of the type defined, and wherein the pressure cylinder and reservoir cylinder are joined and closed at one end by a rod guide through which a piston rod passes, and are joined and closed at their opposite ends by a plug member, the piston, the rod guide and the plug member are ported to permit the flow of hydraulic fluid between the pressure cylinder and the reservoir, and said flow is controlled in each instance by an annular disc valve closure member co-operating with its associated ports to open and close the same in dependence upon the direction of piston movement in the pressure cylinder.

Such valve closure disc members are relatively inexpensive as compared with other valve constructions and by virtue of their configuration contribute significantly to a saving of space in the overall shock absorber size. They may be plate valve closure members urged by springs against valve seats terminating their respectively associated ports, or they may be diaphragm valve members, in which case their characteristics are in part determined by their thickness dimension, so that a required shock absorber damping characteristic may readily be achieved in a given shock absorber design simply by utilising a predetermined thickness of diaphragm.

According to another feature of the invention, the piston and plug member are provided with spring-loaded plate valves, while the rod guide is provided with a diaphragm valve which discharges hydraulic fluid into a shallow annular chamber situated immediately below it in the reservoir, said chamber leading at its end remote from the diaphragm valve into an elongated passage in said reservoir and of substantially less radial width than said chamber. By reason of this construction, hydraulic fluid discharged into the shallow annular chamber has little opportunity to foam and is immediately conducted along a similarly foam-inhibiting narrow passage tending to establish a laminar and stable flow in the discharged fluid before it is returned to the main body of fluid in the reservoir.

Figure 5:
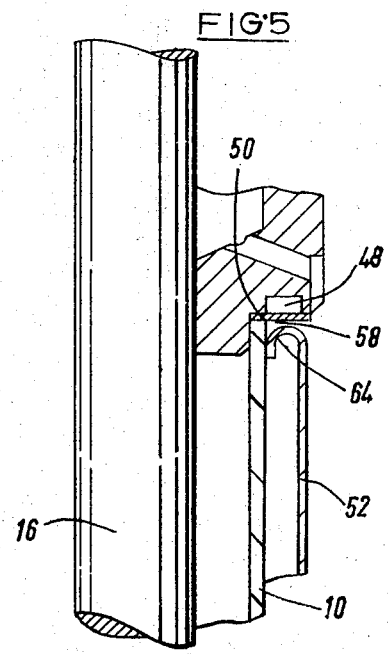

The invention will be described further, by way of example, with reference to the accompanying drawings, in which:

FIG. 1 is an axial section through a telescopic hydraulic shock absorber embodying the invention, FIG. 2 is a transverse sectional detail of the piston rod guide member taken on the line II—II of FIG. 1, FIG. 3 is a detail, to an enlarged scale, of a part of the lower end of the piston rod guide member, and FIGS. 4 and 5 are details in axial section of alternative constructions of an anti-foam sleeve.

In the shock absorber shown in the drawings, a pressure cylinder 10 having a piston 14 working therein is coaxially arranged within an outer cylinder 12, the cylinders being closed at one end by a guide member 18 for the piston rod 16, and being closed at their opposite ends by a plug member 20 which carries a so-called foot valve assembly 22, the rod guide member 18 and plug member 20 also serving to locate the cylinders 10 and 12 relative to one another. The piston rod guide member 18 is an accurate fit within the cooperating end of the outer cylinder 12 and is retained therein by an axially apertured end plate 17 through which the piston rod 16 passes, the end plate 17 in turn being located by a rim portion 13 of the tube 12 which is turned or curled over a wire ring 15 peripherally overlying the end plate 17. The plug member 20 and the piston rod 16 carry eye rings 24 by which the shock absorber is secured to a vehicle, while a cylindrical dust cover 26 depends from the outer end of the piston rod to enclose the rod guide member 18 and the neighbouring region of the outer cylinder 12.

Between the pressure cylinder 10 and the outer cylinder 12 is defined an annular space 28 which constitutes a reservoir for hydraulic fluid, and the arrangement is such that, in operation of the shock absorber, as the piston 14 moves in the cylinder 10, hydraulic fluid flows from the reservoir 28 into the space in the cylinder 10 in front of the piston, through the piston to the cylinder space behind it, and from there through the rod guide member 18 back into the reservoir, this unidirectional flow taking place irrespective of the sense of piston displacement. In order to achieve this, the valve in the foot valve assembly 22, and further valves in the piston 14 and in the rod guide member 18 all act to permit fluid flow in the required direction only, and not in the reverse direction. Thus, the foot valve assembly is ported at 30 and communicates with the reservoir 28 through radial passages 32, the ports 30 being controlled by an annular plate valve closure member 34 which is urged against the inner face of the assembly 22, acting as a valve seat, by a spring 36. The piston 14 is similarly formed with ports 38 controlled by an annular plate valve member 40 loaded by a spring 42. The rod guide member has a central spigot portion 44 at its inner end, for engaging within the pressure cylinder 10, and this spigot portion 44 is formed with three equiangularly spaced, axially directed peripheral grooves 46 (FIG. 2) constituting hydraulic fluid flow ports which communicate laterally with an annular groove 48 formed in the larger diameter portion of the member 18 adjoining the spigot 44. Overlying the groove 48 and seated on the outer margin 19 of the guide member 18 is a diaphragm valve closure member 50 which is clamped between the rod guide member 18 and the pressure cylinder 10. It will be observed that all the valves described act in one direction only, to permit a flow of hydraulic fluid from the reservoir 28 to the space in the cylinder 10 in front of the piston 14, through the latter into the cylinder space behind it, and thence through the rod guide 18 back into the reservoir.

Due to the presence of entrained air in the hydraulic fluid and to the presence of a volume of air or other gas in the reservoir 28 necessary to cater for the changing volume of hydraulic fluid in the reservoir consequent upon piston rod displacement, the discharge of hydraulic fluid through the rod guide valve in particular is liable to give rise to foaming in the hydraulic fluid. To guard against this effect, the illustrated shock absorber comprises a cylindrical anti-foam sleeve or shroud 52 secured coaxially to and in spaced relation around the inner cylinder 10, with which it cooperates to define an annular space 54 for the reservoir air or gas. At its upper end, where it is secured to the cylinder 10, the anti-foam shroud 52 is formed with a radially outwardly inclined shoulder 56 which cooperates with the outer cylinder 12 and with the rod guide member 18 to define an annular discharge chamber 58 for receiving the hydraulic fluid discharged by the rod guide valve, while the remaining and major portion of the shroud 52 is arranged in very close-spaced relation to the inner surface of the outer cylinder 12, thereby creating a narrow annular passage 60 continuing directly from the chamber 58 to the reservoir 28. The discharging hydraulic fluid thus enters the relatively small and shallow chamber 58, where it has virtually no opportunity of foaming, and then continues as an unbroken column of fluid along the narrow passage 60 which tends to produce a laminar and stable flow in the discharged fluid before it joins the main body of fluid in the reservoir 28. As will be appreciated, with air in the upper portion of the shroud 52, hydraulic fluid enters the lower portion of the shroud. For the purpose of defining and limiting the level of the hydraulic fluid within the shroud, the latter is formed towards its lower end region with a radial port 53.

Alternative methods of forming the anti-foam shroud 52 to define the chamber 58 are shown in FIGS. 4 and 5. In FIG. 4, in place of the inclined shoulder 56 of FIG. 1, the shroud 52 has a radially inwardly directed, stepped flange 62, the free inner edge of which is stepped to enable it, together with the diaphragm valve 50, to be clamped between the pressure cylinder 10 and the piston rod guide 18. The stepped portion of the flange 62 co-operates with the rod guide 18 and with the outer cylinder 12 to define the shallow annular chamber 58. In FIG. 5, a similar radial flange is actually turned completely in or curled over to provide a rounded rim 64 which cooperates with the rod guide 18 to define the chamber 58 and by which the shroud is secured to the pressure cylinder 10. It will be observed that the several illustrated ways of defining the chamber 58 result in chambers of different volumes. The volume of chamber 58 is not in fact especially critical except that it must be large enough to receive the fluid discharged by the diaphragm valve 50 without unduly adding to the fluid flow restriction already represented by that valve, while at the same time not being so large as to permit significant foaming to take place in the discharged fluid. In this connection, the size of chamber 58 is to some extent governed by the number or ports 46 in the piston rod guide 18; while only a minimum of three ports 46 have actually been illustrated, more such ports may be provided in some circumstances.

In view of the fact that the diaphragm valve 50 is simply trapped directly between the pressure cylinder 10 and the rod guide 18, it requires to be pre-tensioned in order that it may exert a reasonably accurate degree of restriction on the fluid flow and thus achieve consistent damping characteristics from one damper to another. As shown in FIG 3, therefore, the face of the outer margin 19 of the region of the rod guide having the groove 48 formed therein is raised relative to the remainder of said region, thereby flexing and pre-tensioning the diaphragm 50. The extent to which the outer margin 19 is raised relative to the remainder of the guide is typically between five thousandths and twenty thousandths of an inch, but it will be clear that the damping characteristics of the shock absorber may readily be varied either by changing this dimension, or by substituting a stiffer or weaker diaphragm, or by a combination of both, so that, if desired, a range of shock absorbers of different damping characteristics may be produced from the same basic design, without any other modifications being necessary.

In order to ensure that the pre-tensioning of the diaphragm 50 resulting from the raised margin 19 is initially properly established and thereafter retained in service, the end 11 of the pressure cylinder 10 which abuts the diaphragm 50 and clamps it against the rod guide member 18 is radially inwardly chamfered at an angle not exceeding 3°, as shown to a somewhat exaggerated scale in FIG. 3. It is also convenient to form a shallow bleed notch 19a in the outer margin 19 of the rod guide 18 to permit small fluid flows to take place without operation of the valve member 50 when the amplitude of relative oscillation between the piston 14 and cylinder 10 is only small. To guard against objectionable noise from this fluid flow, the bleed notch 19a must, as indicated be shallow and wide, having a width to depth ratio typically of the order of 15 to 1. The notch 19a may be cut, pressed or stamped in the end face of the outer margin 19.

The invention thus provides a shock absorber having a unidirectional fluid flow circuit while being of simple construction and capable of being mass-produced with predetermined and consistent damping characteristics. The use of plate or diaphragm valves throughout contributes significantly to reliability in operation, while the diaphragm valve 50 in particular enables a wide range of shock absorbers of different characteristices to be produced without major modifications of the remaining components being necessary.

I claim:

1. In a telescopic hydraulic shock absorber comprising a pair of cylinders arranged coaxially one within the other, the inner cylinder constituting a hydraulic pressure cylinder and the outer cylinder co-operating with the inner cylinder to define between them, an annular space constituting a reservoir for hydraulic fluid, a plug member closing and mutually locating said cylinders at one of their ends, a piston rod guide assembly closing and mutually locating the cylinders at their other ends, said rod guide assembly presenting an inner end face directed towards the interiors of said cylinders, a piston in said pressure cylinder, a piston rod extending from said piston through said piston rod guide assembly and valve means in said plug member, said piston and said piston rod guide assembly for establishing a one-way circulation of hydraulic fluid between said pressure cylinder and said reservoir irrespective of the direction of piston movement in said pressure cylinder, the improvement comprising each one of said valve means in the form of an annular disc valve closure member, an outer margin on said rod guide assembly constituting a seat for the peripherally outer region of the disc valve closure member of the valve means in said assembly, said closure member being a diaphragm valve member, and wherein the end face of said outer margin is axially raised relative to the remainder of the end face of said assembly, said diaphragm valve member being clamped between the end of the pressure cylinder and said end face of said guide assembly, whereby said diaphragm valve member is flexed and tensioned against said outer margin.

2. A telescopic hydraulic shock absorber as set forth in claim 1, wherein the extent to which the end face of said outer margin is raised relative to the remainder of the end face of said rod guide assembly is in the range five thousandths to twenty thousandths of one inch.

3. A telescopic hydraulic shock absorber as set forth in claim 1, wherein the end face of the pressure cylinder contiguous with the diaphragm valve member is radially inwardly chamfered to a maximum inclination of 3°.

References Cited

UNITED STATES PATENTS

| | | | |
|---|---|---|---|
| 2,048,285 | 7/1936 | Padgett | 188—88 |
| 2,107,974 | 2/1938 | Bechereau et al. | 188—88 |
| 2,576,658 | 11/1951 | Werner | 188—88 |

FOREIGN PATENTS

| | | |
|---|---|---|
| 120,179 | 7/1945 | Australia. |
| 955,331 | 6/1949 | France. |
| 1,249,490 | 11/1960 | France. |
| 771,899 | 4/1957 | Great Britain. |

MILTON BUCHLER, *Primary Examiner.*

FERGUS S. MIDDLETON, *Examiner.*

G. E. HALVOSA, *Assistant Examiner.*